(12) United States Patent
Sun et al.

(10) Patent No.: US 11,785,666 B2
(45) Date of Patent: *Oct. 10, 2023

(54) METHOD AND APPARATUS FOR SWITCHING RADIO RESOURCE CONTROL RRC STATE

(71) Applicant: HUAWEI TECHNOLOGIES CO., LTD., Guangdong (CN)

(72) Inventors: Xibo Sun, Shanghai (CN); Gong Chen, Shanghai (CN); Chaoping Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,045

(22) Filed: Sep. 8, 2022

(65) Prior Publication Data

US 2023/0007723 A1   Jan. 5, 2023

Related U.S. Application Data

(63) Continuation of application No. 16/991,453, filed on Aug. 12, 2020, now Pat. No. 11,483,894, which is a
(Continued)

(30) Foreign Application Priority Data

Feb. 13, 2018   (CN) .......................... 201810149638.X

(51) Int. Cl.
*H04W 76/27* (2018.01)
*H04W 76/19* (2018.01)
(Continued)

(52) U.S. Cl.
CPC ....... *H04W 76/27* (2018.02); *H04W 52/0212* (2013.01); *H04W 60/00* (2013.01);
(Continued)

(58) Field of Classification Search
CPC ..... H04W 76/27; H04W 76/19; H04W 76/30; H04W 52/0212; H04W 60/00; H04W 85/042
(Continued)

(56) References Cited

U.S. PATENT DOCUMENTS

2016/0088671 A1   3/2016  Bergström et al.
2020/0275515 A1*  8/2020  Li ........................ H04W 76/27
2020/0374968 A1   11/2020 Sun et al.

FOREIGN PATENT DOCUMENTS

CN       105898894 A      8/2016
CN       106658758 A      5/2017
(Continued)

OTHER PUBLICATIONS

3GPP TSG-RAN WG2 Mtg #95, R2-165211 (Aug. 2016) (Year: 2016).*
(Continued)

*Primary Examiner* — William Nealon

(57) ABSTRACT

A method and an apparatus for switching an RRC state includes: sending, by a communications apparatus, indication information to a network device, where the indication information is used to indicate that the communications apparatus requests to enter an RRC inactive state; after completing a registration process of an RRC connected state, receiving, by the communications apparatus, an RRC connection release message that is sent by the network device based on the indication information, where the RRC connection release message is used to indicate the communications apparatus to enter the RRC inactive state; and entering, by the communications apparatus, the RRC inactive state from the RRC connected state based on the RRC connection release message.

20 Claims, 5 Drawing Sheets

Related U.S. Application Data continuation of application No. PCT/CN2019/072966, filed on Jan. 24, 2019.

(51) Int. Cl.
    *H04W 76/30*     (2018.01)
    *H04W 52/02*     (2009.01)
    *H04W 60/00*     (2009.01)
    *H04W 84/04*     (2009.01)

(52) U.S. Cl.
    CPC .......... *H04W 76/19* (2018.02); *H04W 76/30* (2018.02); *H04W 84/042* (2013.01)

(58) Field of Classification Search
    USPC ...................................................... 455/435.1
    See application file for complete search history.

(56) References Cited

FOREIGN PATENT DOCUMENTS

| CN | 106793170 A | 5/2017 |
|---|---|---|
| CN | 107113906 A | 8/2017 |
| CN | 107249221 A | 10/2017 |
| CN | 107666691 A | 2/2018 |
| EP | 2645803 A1 | 10/2013 |
| EP | 3598812 A1 | 1/2020 |
| WO | 2017191926 A1 | 11/2017 |
| WO | 2017194006 A1 | 11/2017 |

OTHER PUBLICATIONS

3GPP TSG-RAN WG2 Mtg #99, R2-1709222 (Aug. 2017) (Year: 2017).*
3GPP TSG-RAN WG2 Mtg #99, R2-1709058 (Aug. 2017) (Year: 2017).*
CMCC, Discussion on UE states in NR, 3GPP TSG-RAN WG2 Meeting #95, Göteborg, Sweden, Aug. 22-26, 2016, R2-165211, 5 pages.
Office Action issued in CN 202010969684.1 dated Jun. 22, 2021, total 12 pages.
European Search Report for Application No. 19755105.4 dated Feb. 26, 2021, 6 pages.
Notice of Allowance issued in CN202010969684.1, dated Jun. 25, 2023, 4 pages.

* cited by examiner

METHOD AND APPARATUS FOR SWITCHING RADIO RESOURCE CONTROL RRC STATE

CROSS-REFERENCE TO RELATED APPLICATIONS

This application is a continuation of U.S. patent application Ser. No. 16/991,453, filed on Aug. 12, 2020, which is a continuation of International Patent Application No. PCT/CN2019/072966, filed on Jan. 24, 2019, which claims priority to Chinese Patent Application No. 201810149638.X, filed on Feb. 13, 2018. All of the aforementioned patent applications are hereby incorporated by reference in their entireties.

TECHNICAL FIELD

This application relates to the communications field, and more specifically, to a method and an apparatus for switching a radio resource control (RRC) state.

BACKGROUND

Compared with a standard protocol of a long term evolution (LTE) system, a standard protocol of a 5th generation (5G) mobile communications system defines a new RRC state, to be specific, an RRC inactive state. In the RRC inactive state, a non-access stratum (NAS) layer is still in a connected state, and behavior of an RRC layer is similar to behavior of an RRC idle state. When a terminal needs to enter an RRC connected state, the terminal does not need to re-perform an RRC connection establishment process, but directly sends an RRC connection resumption request to a network. In other words, in 5G, there are three RRC states: an RRC connected state, an RRC inactive state, and an RRC idle state.

When user equipment (UE) is in the RRC connected state, the network sends, to the UE, an RRC connection release message used to indicate the UE to enter the RRC idle state. After receiving the RRC release message, the UE switches to the RRC idle state. If the UE needs to subsequently initiate a service, the UE may send an RRC connection establishment message, to re-establish an RRC link and enter the RRC connected state. When the UE is in the RRC connected state, the network may alternatively configure the UE to enter the RRC inactive state. If the UE needs to subsequently initiate a service, the UE may send an RRC connection resumption message, to quickly resume an RRC connection and enter the RRC connected state. If an exception occurs when the UE switches from the RRC inactive state to the RRC connected state, the UE enters the RRC idle state. Alternatively, when the UE is in the RRC inactive state, the UE may directly enter the RRC idle state by using an RRC inactive state release message. When the UE is in the RRC inactive state or the RRC idle state, energy consumption of the UE can be reduced. However, the UE in the RRC inactive state can more quickly switch back to the RRC connected state than the UE in the RRC idle state.

In a conventional protocol, a procedure in which the network configures the UE in the RRC connected state to enter the RRC inactive state is as follows: A network device determines, based on load of the UE and detection on service transmission that is performed by the UE for a period of time, whether to configure the UE to enter the RRC inactive state. If the network device determines to configure the UE to enter the RRC inactive state, the network device configures, by using an RRC release message, the UE to enter the RRC inactive state.

In a conventional manner of configuring the UE to enter the RRC inactive state, power consumption of the UE and network resource consumption cannot be reduced to a maximized extent.

SUMMARY

Example embodiments of this application provide a method and an apparatus for switching an RRC state, to effectively reduce power consumption of a terminal-side communications apparatus and reduce network resource consumption.

According to a first aspect, a method for switching an RRC state is provided, and the method for switching an RRC state includes: sending, by a communications apparatus, indication information to a network device, where the indication information is used to indicate that the communications apparatus requests to enter an RRC inactive state; after completing a registration process of an RRC connected state, receiving, by the communications apparatus, an RRC connection release message that is sent by the network device based on the indication information, where the RRC connection release message is used to indicate the communications apparatus to enter the RRC inactive state; and entering, by the communications apparatus, the RRC inactive state from the RRC connected state based on the RRC connection release message.

The communications apparatus is a terminal-side communications apparatus. Specifically, the terminal-side communications apparatus is a terminal device. Alternatively, the terminal-side communications apparatus is a chip or a system-on-a-chip disposed in the terminal device.

In this implementation, the terminal-side communications apparatus can autonomously request to enter the RRC inactive state, so that flexibility of the terminal-side communications apparatus switching from the RRC connected state to the RRC inactive state can be improved. Therefore, compared with the prior art, this implementation can ensure to a relatively large extent that the terminal-side communications apparatus is in the RRC inactive state when the terminal-side communications apparatus does not send data. In this way, energy consumption of the terminal-side communications apparatus can be further reduced, and network resource consumption can also be further reduced.

In a possible implementation of the first aspect, the sending, by a communications apparatus, indication information to a network device includes: before entering the RRC connected state, sending, by the communications apparatus, the indication information to the network device.

In this implementation, the terminal-side communications apparatus can switch to the RRC inactive state within a relatively short time after completing the registration process of the RRC connected state, so that it can be ensured to a large extent that the terminal-side communications apparatus is in the RRC inactive state when the terminal-side communications apparatus does not send data. In this way, the energy consumption of the terminal-side communications apparatus can be effectively reduced, and the network resource consumption can also be reduced.

Optionally, in this implementation, the indication information may be carried in an RRC connection request message.

In this implementation, an uplink message, that is, an RRC connection establishment request message, is used to request the network device that the terminal device needs to enter the RRC inactive state, and no uplink signaling needs to be added. Therefore, signaling overheads can be reduced.

In a possible implementation of the first aspect, the sending, by a communications apparatus, indication information to a network device includes: after entering the RRC connected state and before completing the registration process of the RRC connected state, sending, by the communications apparatus, the indication information to the network device.

In this implementation, the terminal-side communications apparatus can switch to the RRC inactive state within a relatively short time after completing the registration of the RRC connected state, so that it is ensured to a relatively large extent that the terminal-side communications apparatus is in the RRC inactive state when the terminal-side communications apparatus does not send data. In this way, the energy consumption of the terminal-side communications apparatus can be effectively reduced, and the network resource consumption can also be reduced.

Optionally, in this implementation, the indication information may be carried in a registration request message of the RRC connected state.

In this implementation, an uplink instruction, that is, the registration request message of the RRC connected state, is used to request the network device that the terminal device needs to enter the RRC inactive state, and no uplink signaling needs to be added. Therefore, signaling overheads can be reduced.

In a possible implementation of the first aspect, the sending, by a communications apparatus, indication information to a network device includes: after completing the registration process of the RRC connected state, sending, by the communications apparatus, the indication information to the network device.

Optionally, in this implementation, the indication information is carried in an RRC air interface message.

In this implementation, the terminal-side communications apparatus can autonomously request to enter the RRC inactive state. In this way, the energy consumption of the terminal-side communications apparatus can be effectively reduced, and the network resource consumption can also be reduced.

According to a second aspect, a method for switching an RRC state is provided, and the method includes: receiving, by a network device, indication information sent by a communications apparatus, where the indication information is used to indicate that the communications apparatus requests to enter an RRC inactive state; and after the communications apparatus completes a registration process of an RRC connected state, sending, by the network device, an RRC connection release message to the communications apparatus based on the indication information, where the RRC connection release message is used to indicate the communications apparatus to enter the RRC inactive state.

The communications apparatus is a terminal-side communications apparatus. Specifically, the terminal-side communications apparatus is a terminal device. Alternatively, the terminal-side communications apparatus is a chip or a system-on-a-chip disposed in the terminal device.

In this implementation, the terminal-side apparatus can autonomously request to enter the RRC inactive state, so that flexibility of the terminal-side apparatus switching from the RRC connected state to the RRC inactive state can be improved. Therefore, compared with the prior art, this implementation can ensure to a relatively large extent that the terminal-side apparatus is in the RRC inactive state when the terminal-side apparatus does not send data. In this way, energy consumption of the terminal-side apparatus can be further reduced, and network resource consumption can also be further reduced.

In a possible implementation of the second aspect, the method further includes: determining, by the network device by parsing the indication information, that the communications apparatus needs to enter the RRC inactive state.

In a possible implementation of the second aspect, the receiving, by a network device, indication information sent by a communications apparatus includes: receiving, by the network device, the indication information that is sent by the communications apparatus before the communications apparatus enters the RRC connected state.

In this implementation, the terminal-side communications apparatus can switch to the RRC inactive state within a relatively short time after completing the registration process of the RRC connected state, so that it can be ensured to a large extent that the terminal-side communications apparatus is in the RRC inactive state when the terminal-side communications apparatus does not send data. Therefore, the energy consumption of the terminal-side communications apparatus can be effectively reduced, and the network resource consumption can also be reduced.

Optionally, in this implementation, the indication information may be carried in an RRC connection request message.

In this implementation, an uplink message, that is, an RRC connection establishment request message, is used to request the network device that the terminal device needs to enter the RRC inactive state, and no uplink signaling needs to be added. Therefore, signaling overheads can be reduced.

In a possible implementation of the second aspect, the receiving, by a network device, indication information sent by a communications apparatus includes: receiving, by the network device, the indication information that is sent by the communications apparatus after the communications apparatus enters the RRC connected state and before the communications apparatus completes the registration process of the RRC connected state.

In this implementation, the terminal-side communications apparatus can switch to the RRC inactive state within a relatively short time after completing the registration of the RRC connected state, so that it is ensured to a relatively large extent that the terminal-side communications apparatus is in the RRC inactive state when the terminal-side communications apparatus does not send data. In this way, the energy consumption of the terminal-side communications apparatus can be effectively reduced, and the network resource consumption can also be reduced.

Optionally, in this implementation, the indication information may be carried in a registration request message of the RRC connected state.

In this implementation, an uplink instruction, that is, the registration request message of the RRC connected state, is used to request the network device that the terminal device needs to enter the RRC inactive state, and no uplink signaling needs to be added. Therefore, signaling overheads can be reduced.

In a possible implementation of the second aspect, the receiving, by a network device, indication information sent by a communications apparatus includes: receiving, by the network device, the indication information that is sent by the communications apparatus after the communications apparatus completes the registration process of the RRC connected state.

Optionally, in this implementation, the indication information may be carried in an RRC air interface message.

In this implementation, the terminal-side communications apparatus can autonomously request to enter the RRC inactive state. In this way, the energy consumption of the terminal-side communications apparatus can be effectively reduced, and the network resource consumption can also be reduced.

Optionally, in the foregoing implementations, the communications apparatus may have a function of predicting future behavior.

Optionally, in the foregoing implementations, the indication information explicitly indicates that the communications apparatus requests to enter the RRC inactive state, or the indication information implicitly indicates that the communications apparatus requests to enter the RRC inactive state.

According to a third aspect, a communications apparatus is provided, and the communications apparatus is configured to perform the method according to any one of the first aspect or the possible implementations of the first aspect. Specifically, the communications apparatus may include a module configured to perform the method according to any one of the first aspect or the possible implementations of the first aspect.

According to a fourth aspect, a network device is provided, and the network device is configured to perform the method according to any one of the second aspect or the possible implementations of the second aspect. Specifically, the network device may include a module configured to perform the method according to any one of the second aspect or the possible implementations of the second aspect.

According to a fifth aspect, a communications apparatus is provided. The communications apparatus includes a memory and a processor, the memory is configured to store instructions, the processor is configured to execute the instructions stored in the memory, and execution of the instructions stored in the memory enables the processor to perform the method according to any one of the first aspect or the possible implementations of the first aspect.

According to a sixth aspect, a network device is provided. The network device includes a memory and a processor, the memory is configured to store instructions, the processor is configured to execute the instructions stored in the memory, and execution of the instructions stored in the memory enables the processor to perform the method according to any one of the second aspect or the possible implementations of the second aspect.

According to a seventh aspect, a chip is provided. The chip includes a processing module and a communications interface, the processing module is configured to control the communications interface to communicate with the outside, and the processing module is further configured to implement the method according to any one of the first aspect or the possible implementations of the first aspect.

According to an eighth aspect, a chip is provided. The chip includes a processing module and a communications interface, the processing module is configured to control the communications interface to communicate with the outside, and the processing module is further configured to implement the method according to any one of the second aspect or the possible implementations of the second aspect.

According to a ninth aspect, a computer-readable storage medium is provided, and a computer program is stored in the computer-readable storage medium. When the computer program is executed by a computer, the computer is enabled to implement the method according to any one of the first aspect or the possible implementations of the first aspect. Specifically, the computer may be the foregoing terminal-side communications apparatus.

According to a tenth aspect, a computer-readable storage medium is provided, and a computer program is stored in the computer-readable storage medium. When the computer program is executed by a computer, the computer is enabled to implement the method according to any one of the second aspect or the possible implementations of the second aspect. Specifically, the computer may be the foregoing network device.

According to an eleventh aspect, a computer program product including instructions is provided. When the instructions are executed by a computer, the computer is enabled to implement the method according to any one of the first aspect or the possible implementations of the first aspect. Specifically, the computer may be the foregoing terminal-side communications apparatus.

According to a twelfth aspect, a computer program product including instructions is provided. When the instructions are executed by a computer, the computer is enabled to implement the method according to any one of the second aspect or the possible implementations of the second aspect. Specifically, the computer may be the foregoing network device.

DESCRIPTION OF EMBODIMENTS

The following describes the technical solutions of this application with reference to the accompanying drawings.

Figure 1:
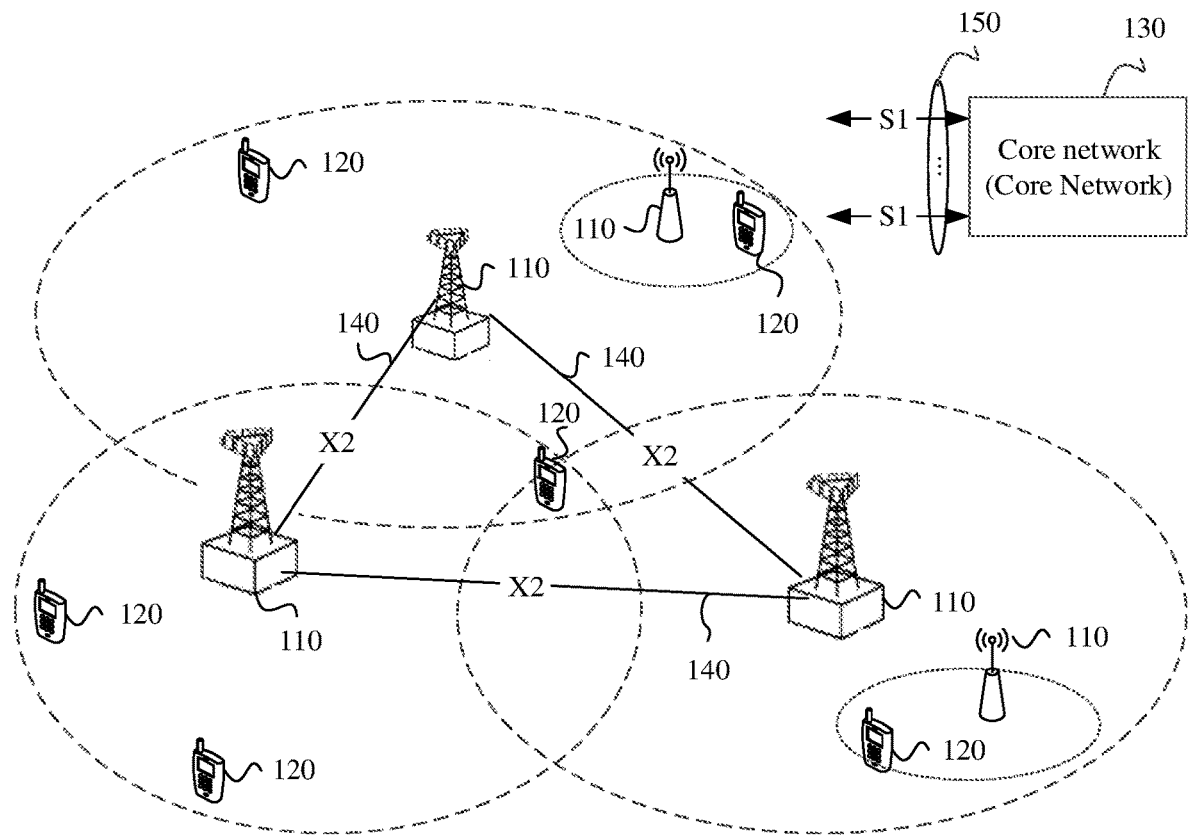
FIG. 1 is a schematic diagram of a communications system according to an embodiment of this application.

FIG. 1 shows a wireless communications system 100 according to an embodiment of this application. The wireless communications system 100 may be a 5th generation (5G) mobile communications system, a new radio (NR) system, or a machine to machine (M2M) system. As shown in FIG. 1, the wireless communications system 100 may include one or more network devices 110, one or more terminal devices 120, and a core network 130.

The network device 110 may be a base station. The base station may be configured to communicate with one or more terminal devices 120, or may be configured to communicate with one or more base stations having some terminal functions (for example, communication between a macro base station and a micro base station such as an access point). The network device 110 may be a base station in the 5G system or the NR system. In addition, the network device 110 may alternatively be an access point (AP), a transmission reception point (TRP), a central unit (CU), or another network entity, and may include some or all functions of the foregoing network entities.

The terminal device 120 may be distributed in the entire wireless communications system 100, and may be stationary or mobile. In some embodiments of this application, the terminal device 120 may be a mobile device, a mobile station, a mobile unit, an M2M terminal, a radio unit, a remote unit, a user agent, a mobile client, user equipment (UE), or the like.

Specifically, the network device 110 may be configured to, under the control of a network device controller (not shown in FIG. 1), communicate with the terminal device 120 through one or more antennas. In some embodiments, the network device controller may be a part of the core network 130, or may be integrated into the network device 110. Specifically, the network device 110 may be configured to transmit control information or user data to the core network 130 through a backhaul interface 150 (for example, an S1 interface). Specifically, the network devices 110 may also communicate with each other directly or indirectly through a backhaul interface 140 (for example, an X2 interface).

The wireless communications system 100 shown in FIG. 1 is merely intended to more clearly describe the technical solutions in this application, but constitutes no limitation on embodiments of this application. A person of ordinary skill in the art may learn that the technical solution provided in this embodiment of this application is also applicable to a similar technical problem as a network architecture evolves and a new service scenario emerges.

The embodiments of this application relate to a network-side communications apparatus. The network-side communications apparatus may be the network device 110 shown in FIG. 1, or may be a chip or a system-on-a-chip disposed inside a network side. For ease of understanding and description, that the network-side communications apparatus is a network device is used as an example for description below.

The embodiments of this application further relate to a terminal-side communications apparatus. The terminal-side communications apparatus may be the terminal device 120 shown in FIG. 1, or may be a chip or a system-on-a-chip disposed inside a terminal device. For ease of understanding and description, that the terminal-side communications apparatus is a terminal device is used as an example for description below.

Figure 2:
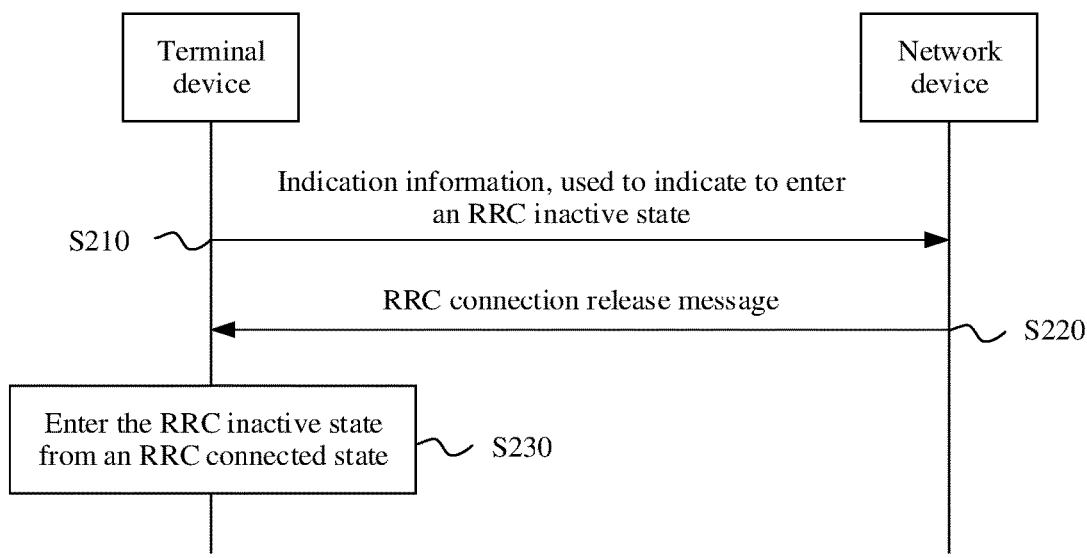
FIG. 2 is a schematic flowchart of a method for switching an RRC state according to an embodiment of this application.

FIG. 2 is a schematic flowchart of a method for switching an RRC state according to an embodiment of this application. A network device shown in FIG. 2 may correspond to the network device 110 in the system 100 shown in FIG. 1, and a terminal device shown in FIG. 2 may correspond to the terminal device 120 in the system 100 shown in FIG. 1. As shown in FIG. 2, the method for switching an RRC state includes the following steps.

S210. A communications apparatus sends indication information to the network device, where the indication information is used to indicate that the communications apparatus requests to enter an RRC inactive state. Correspondingly, the network device receives the indication information sent by the communications apparatus.

Specifically, the indication information is carried in an uplink message. For example, the uplink message includes a field used to carry the indication information.

S220. After the terminal device completes a registration process of an RRC connected state, the network device sends an RRC connection release message to the terminal device based on the indication information, where the RRC connection release message is used to indicate the terminal device to enter the RRC inactive state. Correspondingly, after completing the registration process of the RRC connected state, the terminal device receives the RRC connection release message that is sent by the network device and that is used to indicate to enter the RRC inactive state.

S230. The terminal device enters the RRC inactive state from the RRC connected state based on the RRC connection release message.

In this embodiment of this application, the terminal device may actively initiate a request to enter the RRC inactive state, so that the terminal device can quickly enter the RRC inactive state when the terminal device intends to enter the RRC inactive state. In this way, flexibility of the terminal device in switching from the RRC connected state to the RRC inactive state can be improved. Therefore, in this embodiment of this application, the terminal device is allowed to trigger to enter the RRC inactive state, and compared with the prior art, energy consumption of the terminal device can be further reduced, and network resource consumption can also be further reduced.

Specifically, in S220, after receiving the indication information sent by the terminal device, the network device determines, by parsing the indication information, that the terminal device needs to enter the RRC inactive state; and sends the RRC connection release message to the terminal device after the terminal device completes the registration process of the RRC connected state.

Optionally, in some embodiments, S210 further includes: after completing the registration process of the RRC connected state, sending, by the terminal device, the indication information to the network device.

Specifically, in S210, after completing the registration process of the RRC connected state, the terminal device detects that there is no data to be sent currently, and sends the indication information to the network device. Correspondingly, in S220, after receiving the indication information, the network device immediately sends, to the terminal device, the RRC connection release message used to indicate to enter the RRC inactive state.

It should be understood that "immediately" mentioned in this embodiment is a relative concept. It means that after receiving the indication information sent by the terminal device, the network device sends, to the terminal device at a next downlink sending moment, the RRC connection release message used to indicate to enter the RRC inactive state.

Optionally, in this embodiment, the indication information may be carried in an RRC air interface message.

Figure 3:
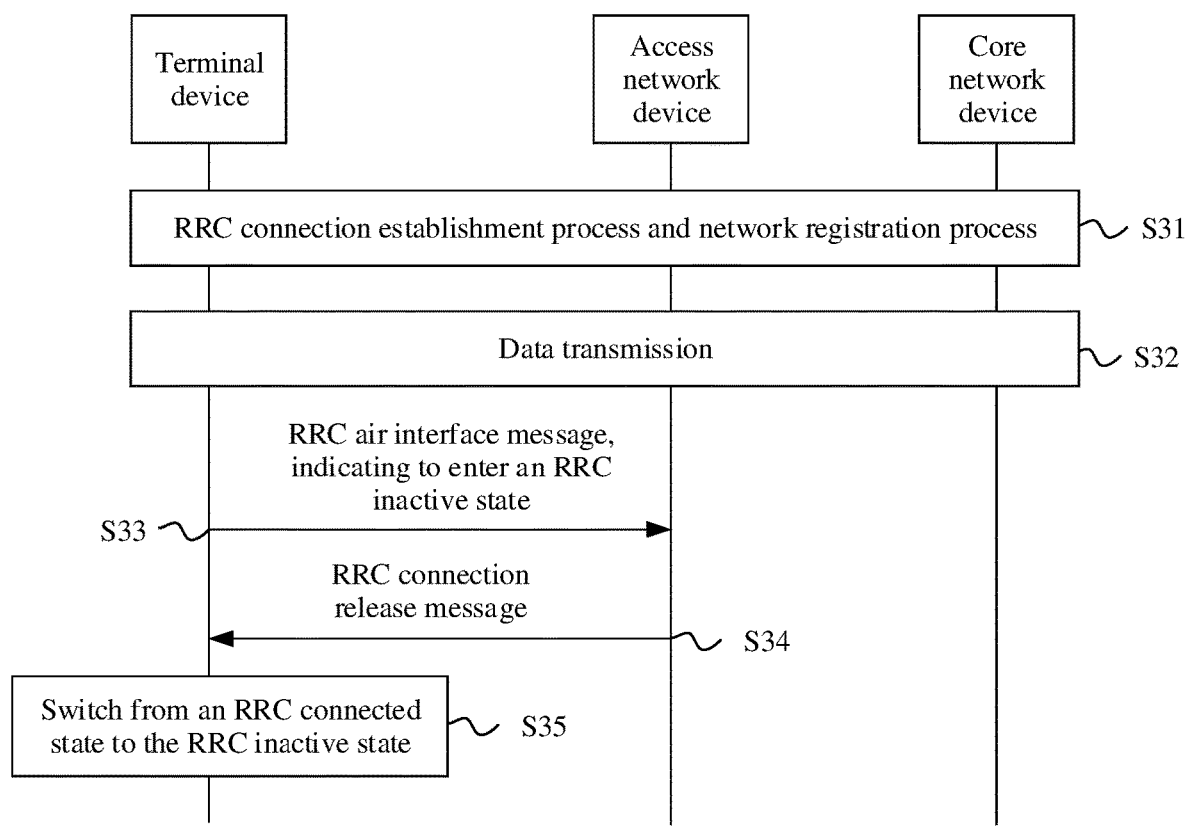
FIG. 3 is another schematic flowchart of a method for switching an RRC state according to an embodiment of this application.

Specifically, as shown in FIG. 3, an access network device shown in FIG. 3 corresponds to a network device in this embodiment. A terminal device, the access network device, and a core network device in FIG. 3 may respectively correspond to the terminal device 120, the network device 110, and the core network device 130 in the system 100 shown in FIG. 1. As shown in FIG. 3, a procedure in which the terminal device autonomously requests to enter an RRC inactive state is as follows: S31. The terminal device performs an RRC connection establishment process and a network registration process (that is, a network access process) with the access network device. S32. The terminal device performs data transmission with network side devices (the access network device and the core network device).

S33. After completing the data transmission, the terminal device detects that there is no data to be transmitted currently, and sends an RRC air interface message to the access network device, where the RRC air interface message carries indication information, and the indication information is used to indicate that the terminal device requests to enter the RRC inactive state. S34. After receiving the RRC air interface message, the access network device sends an RRC connection release message to the terminal device, where the RRC connection release message is used to indicate the terminal device to enter the RRC inactive state. S35. After receiving the RRC connection release message, the terminal device switches from an RRC connected state to the RRC inactive state.

In this embodiment, when detecting that there is no data to be sent currently, the terminal device may request, in real time, to enter the RRC inactive state. In this way, energy consumption of the terminal device can be effectively reduced, and network resource consumption can also be reduced.

Optionally, in some embodiments, S210 further includes: after entering the RRC connected state and before completing the registration process of the RRC connected state, sending, by the terminal device, the indication information to the network device. Correspondingly, the network device receives the indication information that is sent by the terminal device after the terminal device enters the RRC connected state and before the terminal device completes the registration process of the RRC connected state.

Specifically, before completing the registration process of the RRC connected state, the terminal device sends, to the network device in advance, the indication information used to request the terminal device to enter the RRC inactive state. Correspondingly, after the network device receives the indication information, and after the terminal device completes the registration process of the RRC connected state, the network device immediately sends, to the terminal device, the RRC connection release message used to indicate to enter the RRC inactive state. "Immediately" mentioned herein is a relative concept. It indicates that at a first downlink sending moment after the terminal device completes the registration process of the RRC connected state, the network device sends, to the terminal device, the RRC connection release message used to indicate to enter the RRC inactive state.

Therefore, in this embodiment, the terminal device can switch to the RRC inactive state within a relatively short time after completing the registration of the RRC connected state, so that it is ensured to a relatively large extent that the terminal device is in the RRC inactive state when the terminal device does not send data. In this way, the energy consumption of the terminal device can be effectively reduced, and the network resource consumption can also be reduced.

Optionally, in an implementation, the indication information is carried in a registration request message of the RRC connected state.

Figure 4:
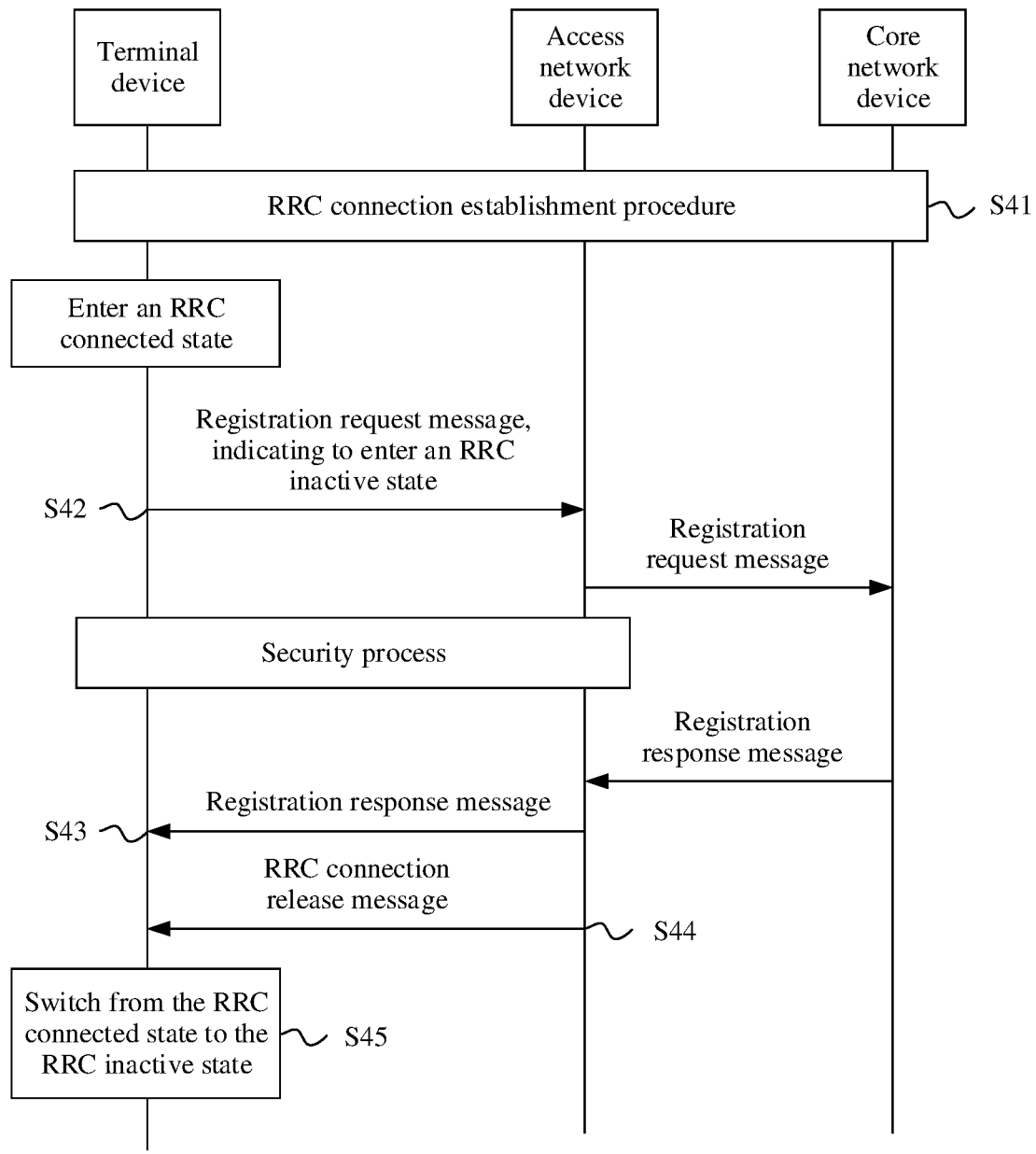
FIG. 4 is still another schematic flowchart of a method for switching an RRC state according to an embodiment of this application.

Specifically, as shown in FIG. 4, an access network device shown in FIG. 4 corresponds to a network device in this embodiment. A terminal device, the access network device, and a core network device in FIG. 4 may respectively correspond to the terminal device 120, the network device 110, and the core network device 130 in the system 100 shown in FIG. 1. As shown in FIG. 4, a procedure in which the terminal device autonomously requests to enter an RRC inactive state is as follows: S41. The terminal device performs an RRC connection establishment process with the access network device. After completing the RRC connection establishment process, the terminal device enters an RRC connected state. S42. The terminal device in the RRC connected state sends a registration request message to the access network device, where the registration request message is used to request network registration, the registration request message further carries indication information, and the indication information is used to indicate that the terminal device requests to enter the RRC inactive state. As shown in FIG. 4, after receiving the registration request message, the access network device forwards the registration request message to the core network device. S43. The core network device sends a registration response message to the terminal device through the access network device. After receiving the registration response message, the terminal device completes the network registration. S44. After sending the registration response message, the access network device sends an RRC connection release message to the terminal device, where the RRC connection release message is used to indicate the terminal device to enter the RRC inactive state. S45. After receiving the RRC connection release message, the terminal device switches from the RRC connected state to the RRC inactive state.

As shown in FIG. 4, a process in which the terminal device completes registration may further include a security process.

Specifically, the registration request message includes a field used to carry the indication information.

In this embodiment, an uplink instruction, that is, the registration request message of the RRC connected state, is used to request the network device that the terminal device needs to enter the RRC inactive state, and no uplink signaling needs to be added. Therefore, signaling overheads can be reduced.

Optionally, in another implementation, the indication information may alternatively be carried in another uplink message that is sent by the terminal device to the network device after the terminal device enters the RRC connected state and before the terminal device completes the registration process of the RRC connected state. This is not limited in embodiments of this application.

Optionally, in some embodiments, S210 further includes: before entering the RRC connected state, sending, by the terminal device, the indication information to the network device. Correspondingly, the network device receives the indication information that is sent by the terminal device before the terminal device enters the RRC connected state.

Specifically, before entering the RRC connected state, the terminal device sends, to the network device in advance, the indication information used to indicate that the terminal device requests to enter the RRC inactive state. Correspondingly, after the terminal device completes the registration process of the RRC connected state, the network device immediately sends, to the terminal device, the RRC connection release message used to indicate to enter the RRC inactive state. "Immediately" mentioned herein is a relative concept. It indicates that at a first downlink sending moment after the terminal device completes the registration process of the RRC connected state, the network device sends, to the terminal device, the RRC connection release message used to indicate to enter the RRC inactive state.

Therefore, in this embodiment, the terminal device can switch to the RRC inactive state within a relatively short time after completing the registration process of the RRC connected state, so that it can be ensured to a large extent that the terminal device is in the RRC inactive state when the terminal device does not send data. Therefore, energy consumption of the terminal device can be effectively reduced, and network resource consumption can also be reduced.

Optionally, in an implementation, the indication information is carried in an RRC connection request message.

Figure 5:
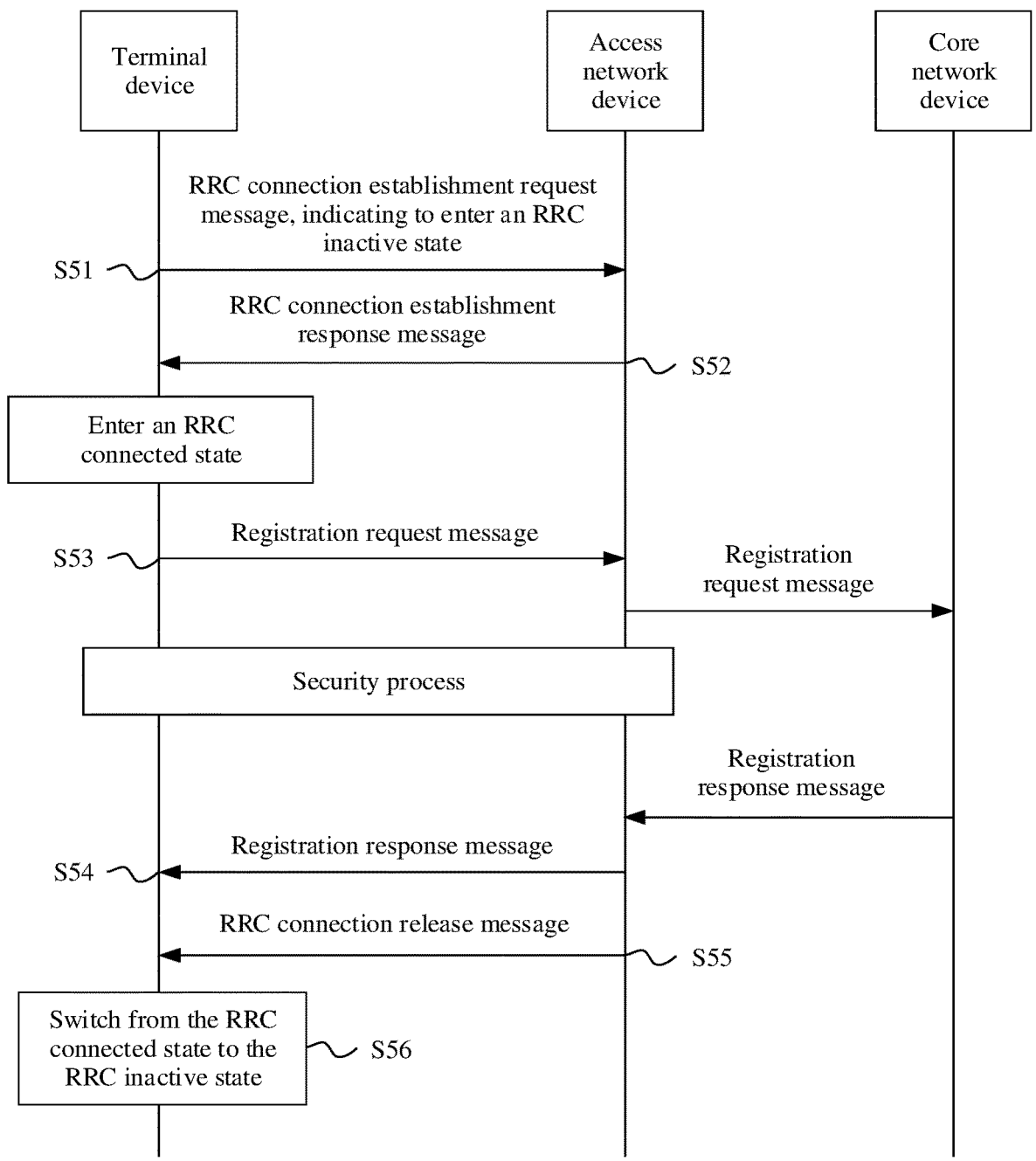
FIG. 5 is still another schematic flowchart of a method for switching an RRC state according to an embodiment of this application.

Specifically, as shown in FIG. 5, an access network device in FIG. 5 corresponds to a network device in this embodiment. A terminal device, the access network device, and a core network device in FIG. 5 may respectively correspond to the terminal device 120, the network device 110, and the core network device 130 in the system 100 shown in FIG. 1. As shown in FIG. 5, a procedure in which the terminal device autonomously requests to enter an RRC inactive state is as follows: S51. The terminal device sends an RRC connection establishment request message to the access network device, where the RRC connection establishment request message is used to request to establish an RRC connection, the RRC connection establishment request message further carries indication information, and the indication information is used to indicate that the terminal device requests to enter the RRC inactive state. S52. The access network device sends an RRC connection establishment response message to the terminal device. In this way, the RRC connection is established, and the terminal device enters an RRC connected state. S53. The terminal device in the RRC connected state sends a registration request message to the access network device, where the registration request message is used to request network registration. As shown in FIG. 5, after receiving the registration request message, the access network device forwards the registration request message to the core network device. S54. The core network device sends a registration response message to the terminal device through the access network device. After receiving the registration response message, the terminal device completes the network registration. S55. After sending the registration response message, the access network device sends an RRC connection release message to the terminal device, where the RRC connection release message is used to indicate the terminal device to enter the RRC inactive state. S56. After receiving the RRC connection release message, the terminal device switches from the RRC connected state to the RRC inactive state.

As shown in FIG. 5, a process in which the terminal device completes registration may further include a security process.

Optionally, the RRC connection establishment request message includes a field used to carry the indication information.

In this embodiment, an uplink message, that is, the RRC connection establishment request message, is used to request the network device that the terminal device needs to enter the RRC inactive state, and no uplink signaling needs to be added. Therefore, signaling overheads can be reduced.

Optionally, in another implementation, the indication information may alternatively be carried in another uplink message that is sent by the terminal device to the network device before the terminal device enters the RRC connected state. This is not limited in embodiments of this application.

Optionally, in the foregoing embodiments, in S210, the indication information reported by the terminal device to the network device explicitly indicates that the terminal device requests to enter the RRC inactive state.

Specifically, the indication information directly indicates that the terminal device requests to enter the RRC inactive state. In other words, after receiving the indication information, the network device directly determines, by parsing the indication information, that the terminal device requests to enter the RRC inactive state.

For example, the indication information is carried in an RRC air interface message (the embodiment shown in FIG. 3). In an example, the RRC air interface message includes an indication field. The indication field includes a bit. When the bit is "1", it indicates that the terminal device requests to enter the RRC inactive state. When the bit is "0", it indicates that the terminal device does not need to enter the RRC inactive state. In this example, a value of the bit included in the indication field corresponds to the indication information. It should be understood that both the terminal device and the network device learn of meanings represented by different values of the bit in the indication field included in the RRC air interface message.

For example, the indication information is carried in a registration request message of the RRC connected state (the embodiment shown in FIG. 4). In an example, the registration request message includes an indication field. The indication field includes a bit. When the bit is "1", it indicates that the terminal device requests to enter the RRC inactive state. When the bit is "0", it indicates that the terminal device does not need to enter the RRC inactive state. In this example, a value of the bit included in the indication field corresponds to the indication information. It should be understood that both the terminal device and the network device learn of meanings represented by different values of the bit in the indication field included in the registration request message.

For example, the indication information is carried in an RRC connection establishment request message (the embodiment shown in FIG. 5). In an example, the RRC connection establishment request message includes an indication field. The indication field includes a bit. When the bit is "1", it indicates that the terminal device requests to enter the RRC inactive state. When the bit is "0", it indicates that the terminal device does not need to enter the RRC inactive state. In this example, a value of the bit included in the indication field corresponds to the indication information. It should be understood that both the terminal device and the network device learn of meanings represented by different values of the bit in the indication field included in the RRC connection establishment request.

Optionally, in the foregoing embodiments, in step 210, the indication information reported by the terminal device to the network device implicitly indicates that the terminal device requests to enter the RRC inactive state.

Specifically, the indication information indicates that the terminal device does not need to send data. In other words, after receiving the indication information, the network device directly determines, by parsing the indication information, that the terminal device does not need to send data. Based on this, the network device determines that the terminal device needs to enter the RRC inactive state.

For example, the indication information is carried in an RRC air interface message (the embodiment shown in FIG. 3). In an example, the RRC air interface message includes an indication field. The indication field includes a bit. When the bit is "1", it indicates that the terminal device does not need to send data. When the bit is "0", it indicates that the terminal device needs to send data. In this example, a value of the bit included in the indication field corresponds to the indication information. It should be understood that both the terminal device and the network device learn of meanings represented by different values of the bit in the indication field included in the RRC air interface message. In this example, when the bit in the indication field included in the RRC air interface message is "1", the network device determines that the terminal device does not need to send data, and determines that the terminal device needs to enter the RRC inactive state.

For example, the indication information is carried in a registration request message of the RRC connected state (the embodiment shown in FIG. 4). In an example, the registration request message includes an indication field. The indication field includes a bit. When the bit is "1", it indicates that the terminal device does not need to send data. When the bit is "0", it indicates that the terminal device needs to send data. In this example, a value of the bit included in the indication field corresponds to the indication information. It should be understood that both the terminal device and the network device learn of meanings represented by different values of the bit in the indication field included in the registration request message. In this example, when the bit in the indication field included in the registration request message is "1", the network device determines that the terminal device does not need to send data, and determines that the terminal device needs to enter the RRC inactive state.

For example, the indication information is carried in an RRC connection establishment request message (the embodiment shown in FIG. 5). In an example, the RRC connection establishment request message includes an indication field. The indication field includes a bit. When the bit is "1", it indicates that the terminal device does not need to send data. When the bit is "0", it indicates that the terminal device needs to send data. In this example, a value of the bit included in the indication field corresponds to the indication information. It should be understood that both the terminal device and the network device learn of meanings represented by different values of the bit in the indication field included in the RRC connection establishment request. In this example, when the bit in the indication field included in the RRC connection establishment request message is "1", the network device learns that the terminal device does not need to send data, and determines that the terminal device needs to enter the RRC inactive state.

Optionally, the terminal device in this embodiment of this application may have a function of predicting future behavior.

Specifically, the terminal device may intelligently predict future behaviors of the terminal device. For example, the terminal device predicts the future behaviors through machine learning. It should be understood that a specific manner in which the terminal device predicts the future behaviors is not limited in embodiments of this application.

In an example, before accessing a network (the terminal device enters the RRC connected state and completes the network registration), the terminal device predicts that the terminal device does not need to immediately send data after accessing the network. In this case, the terminal device may carry, in the RRC connection request message, the indication information used to indicate that the terminal device requests to enter the RRC inactive state. For specific content, refer to the foregoing description with reference to FIG. 5. Alternatively, the terminal device may carry, in the registration request message of the RRC connected state, the indication information used to indicate that the terminal device requests to enter the RRC inactive state. For specific content, refer to the foregoing description with reference to FIG. 4.

In another example, the terminal device in the RRC connected state predicts that the terminal device does not need to send data in a future period of time. In this case, the terminal device may send an RRC air interface message to the network device. The RRC air interface message carries the indication information used to indicate that the terminal device requests to enter the RRC inactive state.

In still another example, if the terminal device in the RRC connected state predicts that the terminal device does not need to send data in a future period of time after completing current service data transmission, the terminal device sends an RRC air interface message to the network device. The RRC air interface message is used to indicate that the terminal device requests to enter the RRC inactive state after completing the current service data transmission. Correspondingly, after the network device receives the RRC air interface message and completes the current service data transmission with the terminal device, the network device sends, to the terminal device at a next downlink sending moment, the RRC connection release message used to indicate to enter the RRC inactive state.

In this embodiment, by predicting future behaviors, the terminal device may send, to the network device in advance, the indication information used to request to enter the RRC inactive state, so that it can be ensured to a relatively large extent that the terminal device is in the RRC inactive state when the terminal device does not send data. In this way, power consumption of the terminal device can be reduced, and network resource consumption can also be reduced.

In conclusion, in this embodiment of this application, the terminal device may actively initiate a request to enter the RRC inactive state, so that the terminal device can relatively quickly enter the RRC inactive state when the terminal device intends to enter the RRC inactive state. In this way, flexibility of the terminal device in switching from the RRC connected state to the RRC inactive state can be improved. Therefore, in this embodiment of this application, the terminal device is allowed to trigger to enter the RRC inactive state, and compared with the prior art, the energy consumption of the terminal device can be further reduced, and the network resource consumption can also be further reduced.

It should be understood that, in this embodiment of this application, after the terminal device autonomously enters the RRC inactive state, when there is data to be sent, the terminal device may send an RRC connection resumption request to the network device, to enter the RRC connected state to perform data transmission.

The foregoing describes the method for switching an RRC state provided in the embodiments of this application, and the following describes an apparatus for switching an RRC state provided in the embodiments of this application. It should be understood that descriptions of the apparatus embodiments correspond to the descriptions of the method embodiments. Therefore, for content that is not described in detail, refer to the foregoing method embodiments.

The foregoing mainly describes the solutions provided in the embodiments of this application from a perspective of interaction between network elements. It may be understood that the network elements, for example, a transmit end device or a receive end device, include corresponding hardware structures and/or software modules for performing the functions, to implement the foregoing functions. A person of ordinary skill in the art should easily be aware that, in combination with the examples described in the embodiments disclosed in the present disclosure, units, algorithms steps in the present disclosure may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, a transmit end device or a receive end device may be divided into functional modules based on the foregoing method examples. For example, the transmit end device or the receive end device may be divided into functional modules corresponding to functions, or two or more functions may be integrated into one processing module. The integrated module may be implemented in a form of hardware, or may be implemented in a form of a software functional module. It should be noted that, in the embodiment of this application, module division is exemplary, and is merely logical function division. In actual implementation, another division manner may be used. An example in which functional modules are divided based on functions is used below for description.

An embodiment of this application provides a communications apparatus. The communications apparatus may be a terminal device. Alternatively, the communications apparatus is a chip or a system-on-a-chip disposed in the terminal device. The communications apparatus may be configured to perform an action performed by the terminal device in the foregoing method embodiments.

Figure 6:
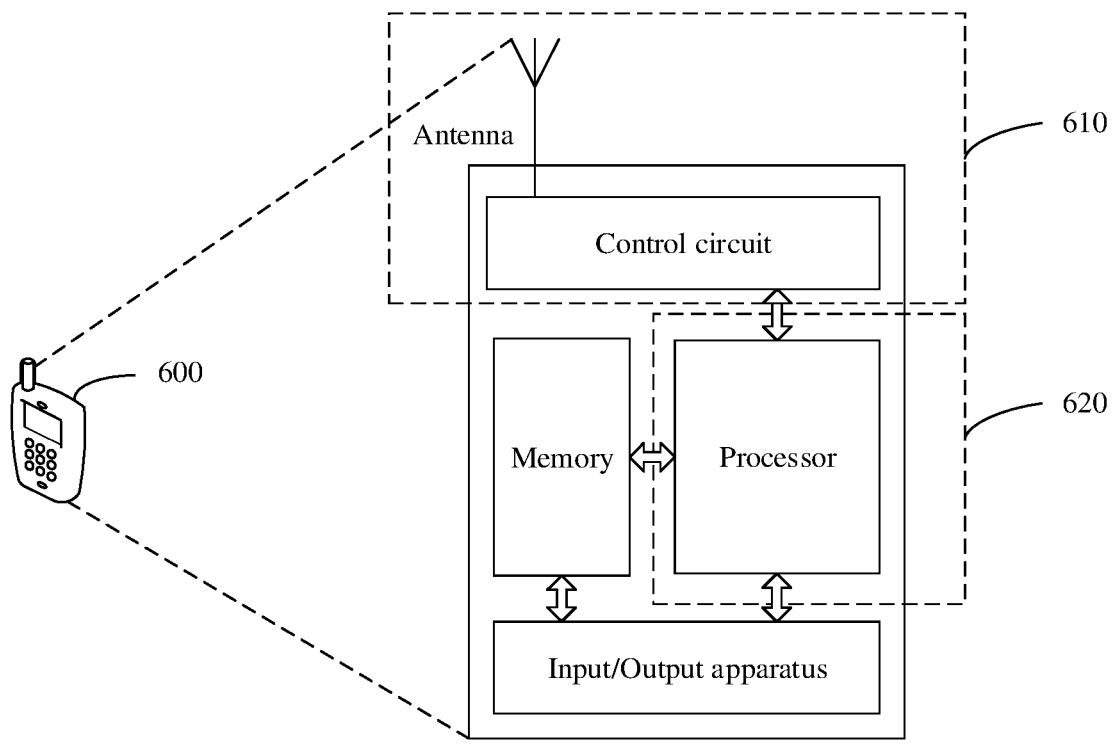
FIG. 6 is a schematic structural diagram of a communications apparatus according to an embodiment of this application.

When the communications apparatus is a terminal device, FIG. 6 is a simplified schematic structural diagram of a terminal device 600. For ease of understanding and illustration, in FIG. 6, the terminal device 600 is, for example, a mobile phone. As shown in FIG. 6, the terminal device 600 includes a processor 620, a memory 630, a radio frequency circuit 611, an antenna 612, and an input/output apparatus 640. The processor 620 is mainly configured to: process a communications protocol and communication data, control the terminal device 600, execute a software program, process data of the software program, and the like. The memory 630 is mainly configured to store the software program and the data. The radio frequency circuit 611 is mainly configured to: perform conversion between a baseband signal and a radio frequency signal, and process the radio frequency signal. The antenna 612 is mainly configured to send and receive a radio frequency signal in a form of an electromagnetic wave. The input/output apparatus 640, such as a touchscreen, a display, or a keyboard, is mainly configured to: receive data input by a user and output data to the user. It should be noted that some types of terminal devices may have no input/output apparatus.

When data needs to be sent, after performing baseband processing on the to-be-sent data, the processor 620 outputs a baseband signal to the radio frequency circuit 611; and the radio frequency circuit 611 performs radio frequency processing on the baseband signal and then sends the radio frequency signal to the outside in a form of an electromagnetic wave by using the antenna 612. When there is data to be sent to the terminal device 600, the radio frequency circuit 611 receives a radio frequency signal by using the antenna 612, converts the radio frequency signal into a baseband signal, and outputs the baseband signal to the processor 620. The processor 620 converts the baseband signal into data, and processes the data. For ease of description, FIG. 6 shows only one memory and one processor. In another example terminal device product, there may be one or more processors and one or more memories. The memory 630 may also be referred to as a storage medium, a storage device, or the like. The memory 630 may be disposed independent of the processor 620, or may be integrated with the processor 620. This is not limited in embodiments of this application.

In this embodiment of this application, the antenna 612 and the radio frequency circuit 611 that have receiving and sending functions may be considered as a transceiver unit of the terminal device 600, and the processor 620 that has a processing function may be considered as a processing unit of the terminal device 600. As shown in FIG. 6, the terminal device 600 includes a transceiver unit 610 and the processor 620. The transceiver unit 610 may also be referred to as a transceiver, a transceiver machine, a transceiver apparatus, or the like. The processor 620 may also be referred to as a processing unit, a processing board, a processing module, a processing apparatus, or the like. Optionally, a component that is in the transceiver unit 610 and that is configured to implement a receiving function may be considered as a receiving unit, and a component that is in the transceiver unit 610 and that is configured to implement a sending function may be considered as a sending unit. In other words, the transceiver unit 610 includes the receiving unit and the sending unit. The transceiver unit 610 sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

For example, in an implementation, the transceiver unit 610 is used to perform the receiving and sending operations on the terminal device side in FIG. 2. The processor 620 is used to parse the RRC connection release message received in S220 in FIG. 2, and control the terminal device 600 to enter the RRC inactive state.

For another example, in an implementation, the transceiver unit 610 is used to perform the receiving and sending operations on the terminal device side in FIG. 3. The processor 620 is used to parse the RRC connection release message received in S34 in FIG. 3, and control the terminal device 600 to enter the RRC inactive state.

In another implementation, the transceiver unit 610 is used to perform the receiving and sending operations on the terminal device side in FIG. 4. The processor 620 is used to parse the RRC connection release message received in S44 in FIG. 4, and control the terminal device 600 to enter the RRC inactive state.

In another implementation, the transceiver unit 610 is used to perform the receiving and sending operations on the terminal device side in FIG. 5. The processor 620 is used to parse the RRC connection release message received in S55 in FIG. 5, and control the terminal device 600 to enter the RRC inactive state.

When the first communications apparatus is a chip, the chip includes a transceiver unit and a processing unit. The transceiver unit may be an input/output circuit or a communications interface. The processing unit is a processor, a microprocessor, or an integrated circuit integrated on the chip.

An embodiment of this application further provides a communications apparatus. The communications apparatus may be a network device or a chip. The communications apparatus may be configured to perform an action performed by the network device in the foregoing method embodiments.

Figure 7:
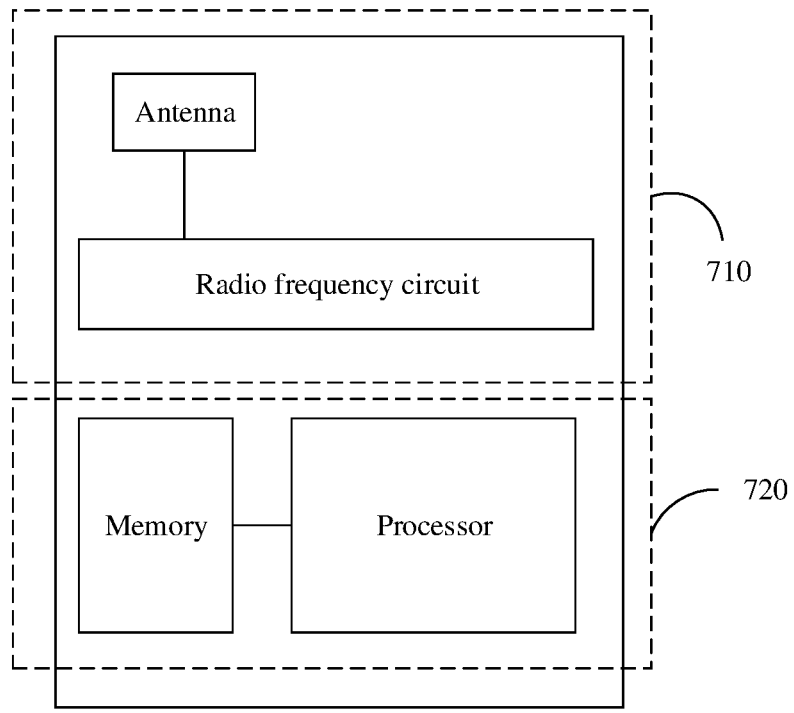
FIG. 7 is a schematic structural diagram of another communications apparatus according to an embodiment of this application.

When the communications apparatus is a network device, and is specifically, for example, a base station, FIG. 7 is a simplified schematic structural diagram of a base station according to an embodiment. The base station includes a part 710 and a part 720. The part 710 is mainly configured to receive and send a radio frequency signal, and perform conversion between the radio frequency signal and a baseband signal. The part 720 is mainly used for baseband processing, base station control, and the like. The part 710 may be usually referred to as a transceiver unit, a transceiver machine, a transceiver circuit, a transceiver, or the like. The part 720 is usually a control center of the base station, may usually be referred to as a processing unit, and is configured to control the base station to perform the steps performed by the network device side in FIG. 2 to FIG. 5 above. For details, refer to the descriptions of the parts related to the method embodiments above.

The transceiver unit in the part 710 may also be referred to as a transceiver machine, a transceiver, or the like. The transceiver unit includes an antenna 712 and a radio frequency circuit 711. The radio frequency circuit 711 is mainly used for radio frequency processing. Optionally, a component that is in the part 710 and that is configured to implement a receiving function may be considered as a receiving unit, and a component configured to implement a sending function may be considered as a sending unit. In other words, the part 710 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 720 may include one or more boards. Each board may include one or more processors and one or more memories. The processor 722 is configured to read and execute a program in the memory 721, to implement a baseband processing function and controlling of the base station. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the transceiver unit 710 is configured to perform the receiving and sending operations on the network device side in FIG. 2. The processing unit 720 is configured to parse the indication information received in S210 in FIG. 2.

For another example, in an implementation, the transceiver unit 710 is configured to perform the receiving and sending operations on the network device side in FIG. 3. The processing unit 720 is configured to parse the RRC air interface message received in S33 in FIG. 3.

In another implementation, the transceiver unit 710 is configured to perform the receiving and sending operations on the network device side in FIG. 4. The processing unit 720 is configured to parse the registration request message received in S42 in FIG. 4.

In another implementation, the transceiver unit 710 is configured to perform the receiving and sending operations on the network device side in FIG. 5. The processing unit 720 is configured to parse the RRC connection establishment request message received in S51 in FIG. 5.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

For explanations and beneficial effects of related content of any of the communications apparatuses provided above, refer to the corresponding method embodiments provided above.

An embodiment of this application further provides a computer-readable storage medium, and a computer program is stored in the computer-readable storage medium. When the computer program is executed by a computer, the computer is enabled to implement an operation performed by a terminal side in the foregoing method embodiments, or when the computer program is executed by a computer, the computer is enabled to implement an operation performed by a network side in the foregoing method embodiments.

An embodiment of this application further provides a computer program product including instructions. When the instructions are executed by a computer, the computer is enabled to implement one or more operations performed by a terminal side in the foregoing method embodiments, or when the instructions are executed by a computer, the computer is enabled to implement one or more operations performed by a network side in the foregoing method embodiments.

It should be understood that, the processor mentioned in the embodiments of the present disclosure may be a central processing unit (CPU), or the processor may be another general purpose processor, a digital signal processor (DSP), an application-specific integrated circuit (ASIC), a field programmable gate array (FPGA) or another programmable logical device, discrete gate, or transistor logical device, a discrete hardware component, or the like. The general purpose processor may be a microprocessor, or the processor may be any conventional processor or the like.

It may be further understood that the memory mentioned in the embodiments of the present disclosure may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. By way of an example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, or another programmable logic device, discrete gate, transistor logic device, or discrete hardware component, the memory (storage module) is integrated into the processor.

It should be noted that the memory described in the present disclosure is intended to include but is not limited to these and any memory of another proper type.

A person of ordinary skill in the art may be aware that, in combination with the examples described in the embodiments disclosed in the present disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to the corresponding process in the foregoing method embodiments.

In the several embodiments provided in this application, it should be understood that the disclosed system, apparatus, and method may be implemented in other manners. For example, the described apparatus embodiments are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method used in a terminal comprising:
before completing a process of registering a radio resource control (RRC) connected state of the terminal with a network device, sending indication information to the network device, wherein the indication information indicates that the terminal requests to enter an RRC inactive state;
after completing the process of registering the RRC connected state of the terminal with the network device, receiving an RRC connection release message from the network device based on the indication information, wherein the RRC connection release message indicates the terminal to enter the RRC inactive state; and
entering the RRC inactive state from the RRC connected state based on the RRC connection release message.

2. The method according to claim 1, wherein the sending of the indication information to the network device comprises:
before entering the RRC connected state, sending the indication information to the network device.

3. The method according to claim 2, wherein the indication information is carried in an RRC connection request message.

4. The method according to claim 1, wherein the sending of the indication information to the network device comprises:
after entering the RRC connected state and before completing the process of registering the RRC connected state of the terminal with the network device, sending the indication information to the network device.

5. The method according to claim 4, wherein the indication information is carried in a registration request message of the RRC connected state.

6. A method used in a network device, comprising:
receiving indication information from a terminal that has not completed a process of registering a radio resource control (RRC) connected state of the terminal with the network device, wherein the indication information indicates that the terminal requests to enter an RRC inactive state; and
sending an RRC connection release message to the terminal that has completed the process of registering the RRC connected state of the terminal with the network device, based on the indication information, wherein the RRC connection release message indicates the terminal to enter the RRC inactive state.

7. The method according to claim 6, wherein the receiving of the indication information from the terminal comprises:
receiving the indication information from the terminal that has not entered the RRC connected state.

8. The method according to claim 7, wherein the indication information is carried in an RRC connection request message.

9. The method according to claim 6, wherein the receiving of the indication information from the terminal comprises:
receiving the indication information from the terminal that has entered the RRC connected state but has not completed the process of registering the RRC connected state of the terminal with the network device.

10. The method according to claim 9, wherein the indication information is carried in a registration request message of the RRC connected state.

11. An apparatus comprising:
one or more processors configured to:
before completing a process of registering a radio resource control (RRC) connected state of the apparatus with a network device, send indication information to the network device, wherein the apparatus is a terminal and the indication information indicates that the apparatus requests to enter an RRC inactive state;

after completing the process of registering the RRC connected state of the apparatus with the network device, receive an RRC connection release message from the network device based on the indication information, wherein the RRC connection release message indicates the apparatus to enter the RRC inactive state; and enter the RRC inactive state from the RRC connected state based on the RRC connection release message.

12. The apparatus according to claim 11, wherein the one or more processors is further configured to:

before entering the RRC connected state, send the indication information to the network device.

13. The apparatus according to claim 12, wherein the indication information is carried in an RRC connection request message.

14. The apparatus according to claim 11, wherein the one or more processors is further configured to:

after entering the RRC connected state and before completing the process of registering the RRC connected state of the apparatus with the network device, send the indication information to the network device.

15. The apparatus according to claim 14, wherein the indication information is carried in a registration request message of the RRC connected state.

16. An apparatus, comprising:

one or more processors configured to:

receive indication information from a terminal that has not completed a process of registering a radio resource control (RRC) connected state of the terminal with the apparatus, wherein the indication information indicates that the terminal requests to enter an RRC inactive state; and send an RRC connection release message to the terminal that has completed the process of registering the RRC connected state of the terminal with the apparatus, based on the indication information, wherein the RRC connection release message indicates the terminal to enter the RRC inactive state.

17. The apparatus according to claim 16, wherein the one or more processors is further configured to:

receive the indication information from the terminal that has not entered the RRC connected state.

18. The apparatus according to claim 17, wherein the indication information is carried in an RRC connection request message.

19. The apparatus according to claim 16, wherein the one or more processors is further configured to:

receive the indication information from the terminal that has entered the RRC connected state but has not completed the process of registering the RRC connected state of the terminal.

20. The apparatus according to claim 19, wherein the indication information is carried in a registration request message of the RRC connected state.

* * * * *